United States Patent

[11] 3,584,608

[72] Inventor Masao Shibagaki
 Asa-gun, Japan
[21] Appl. No. 829,942
[22] Filed June 3, 1969
[45] Patented June 15, 1971
[73] Assignee Toyo Kogyo Co., Ltd.
 Aki-gun Hiroshima-ken, Japan
[32] Priority June 3, 1968
[33] Japan
[31] 43/38106

[54] IGNITION SYSTEM FOR ROTARY PISTON INTERNAL COMBUSTION ENGINE
 3 Claims, 1 Drawing Fig.
[52] U.S. Cl. ........................................... 123/8.45,
 123/8.09, 123/117, 123/148, 418/61
[51] Int. Cl. ........................................ F02b 53/12
[50] Field of Search ............................. 123/8 JJ, 8
 GOK, 117, 117 (.1), 148 DS, 8.09, 8.45; 418/61

[56] References Cited
 UNITED STATES PATENTS
1,861,417 5/1932 Klaiber .................. 123/117
2,380,707 7/1945 Sawyer .................. 123/148DS
2,988,074 6/1961 Lobdell et al. ........ 123/117(.1)X
3,229,674 1/1966 Muller .................. 123/8(JJ)

Primary Examiner—Allan D. Herrmann
Attorney—Sughrue, Rothwell, Mion, Zinn and Macpeak ABSTRACT: A rotary piston internal combustion engine carries two ignition plugs exposed to a common combustion chamber with ignition circuits corresponding to the two plugs including means for delaying the ignition time for either of the two ignition plugs in response to low speed and/or low load operation of the engine.

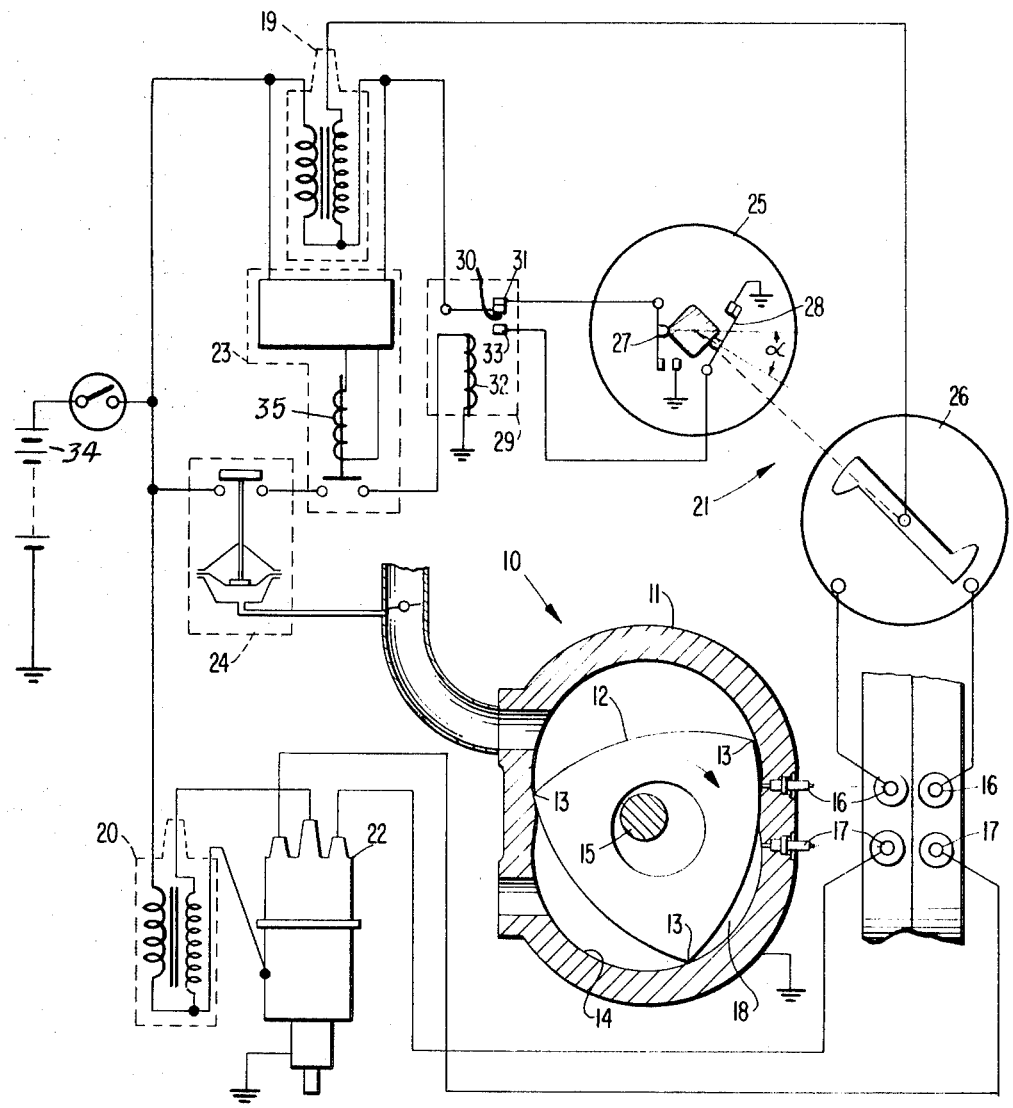

IGNITION SYSTEM FOR ROTARY PISTON INTERNAL COMBUSTION ENGINE

BACKGROUND OF THE INVENTION

1. Field of the Invention

This invention relates to ignition systems for rotary piston internal combustion engines and more particularly to ignition systems for rotary piston internal combustion engines of the type having two plugs in which the ignition timing of either one of the plugs is delayed to remove unburned exhaust gases having detrimental components under low speed and/or low load operation of the engine.

2. Description of THE Prior Art

Hitherto, in order to improve the performance of a rotary piston internal combustion engine, the engine is provided with a plurality of ignition plugs within one combustion chamber with appropriate ignition circuits respectively connected to the two plugs. In such an engine, the detrimental components contained within the exhaust gas, particularly unburned hydrocarbons, may be effectively lowered by delaying the ignition timing of either of the two ignition plugs. It follows that the combustion of the gas mixture is continued even within the exhaust manifold by delaying the ignition timing so that the temperature of the exhaust manifold is raised to a level sufficient to cause complete combustion. This is not always true in the entire operating range of the engine but is effective during operation at low speeds and/or low loads wherein the removal of detrimental components contained within the exhaust gas achieved without lowering the general the performance of the engine.

SUMMARY OF THE INVENTION

The present invention provides an ignition system for a rotary piston internal combustion engine which removes detrimental components such as unburned hydrocarbons and carbon monoxide contained within the exhaust gas of the rotary piston internal combustion engine, especially under operation at low speeds and/or low loads. The invention, accordingly contemplates the elimination of the drawbacks of convention rotary piston internal combustion engines and provides a new and improved ignition system for the same which includes a switch opened and closed by detecting the engine r.p.m. and a switch closed or opened by the engine intake vacuum whereby at low speed and/or at low load, the density of the detrimental components contained within the exhaust gas may be effectively lowered, without lowering the general performance of the engine, by delaying abruptly the ignition timing of either of the two ignition plugs.

BRIEF DESCRIPTION OF THE DRAWINGS

The single FIGURE is a schematic electrical circuit of an ignition system constructed according to the principles of the present invention.

DESCRIPTION OF THE PREFERRED EMBODIMENTS

Turning to the drawing, a rotary piston internal combustion engine shown generally at 10 includes a housing 11, and a polygonal rotary piston 12 which is rotated eccentrically so that the apex edges 13 slide in contact with the multicircular internal surface 14 of the housing 11. Shaft 15 is rotatably carried by the housing 11 and carries rotary piston 12, the rotary piston 12 rotating to perform its operating steps in such a manner that the volume formed between the housing 11 and the rotary piston 12 is constantly changing. Two ignition plugs 16 and 17 are mounted in the wall of the housing 11 and open up into a common combustion chamber 18 from the internal surface 14 of housing 11. The leading ignition plug 17 is disposed in leading relationship with respect to the direction of rotation of the rotary piston 12 as indicated by the arrow, and the other plug, designated as a trailing ignition plug 16, is disposed in trailing relationship with respect to the direction of rotation of the piston 12. A pair of ignition coils 19 and 20 are connected to a battery 34 and to distributors 21 and 22 respectively. Distributors 21 and 22 are connected to ignition plugs 16 and 17 respectively.

The distributor 21 for the trailing ignition plug 16 includes an interrupting device 25 and a distributing device 26. The interrupting device 25 includes a primary contact point 27 operating under normal conditions and a secondary contact point 28 provided to open at a predetermined delay angle $\alpha$ from that of the normal contact point 27. The distributor 22 for the leading ignition plug 17 includes an interrupting device having a single contact point (not shown) always operating normally and a distributing device (not shown) which is same as that of the distributor 21. A switching relay 29, has normally closed contacts 30—31, a relay coil 32, and normally open contacts 30—33 operated to close when the relay coil 32 is energized. Switching relay 29 is disposed between the ignition coil 19 and the interrupting device 25.

Movable contact 30 is connected to ignition coil 19, the stationary contact 31 is connected to the normal contact point 27 of interrupting device 25, and the stationary contact 33 of the switching relay 29 is connected to contact point 28 of the same interrupting device 25. A speed detecting switch 23 including a relay coil 35 is provided for operating the operate switching relay 29 by detecting the engine r.p.m. such that switch 23 opens when revolutions exceeds a predetermined value. A vacuum diaphragm switch 24 is provided for operating the switching relay 29 in response to the level of intake manifold vacuum such that the diaphragm switch 24 is normally open but closes when the intake vacuum exceeds a predetermined value. Switches 23 and 24 are disposed in the relay circuit which includes the battery 35 and the relay coil 32 as a component of switching relay 29. Relay coil 32 is adapted to be energized only upon the simultaneous operation of normally open vacuum diaphragm switch 24 and speed detecting switch 23.

During operation, when the engine is operating at low speed and low load, the vacuum diaphragm switch 24 and switch 23 close such that the switching relay 29 is energized to move the movable contact to a position such that contacts 30 and 31 are open and contacts 30 and 33 are closed. This results in current flowing through the ignition coil 19 and interrupted by the secondary contact point 28 rather than the primary contact point 27. It follows that the ignition timing of the trailing ignition plug 16 is delayed abruptly by 2 $\alpha$ in case where the ratio of the revolutions between the shaft 15 of the engine and the distributor is 1:2. The ignition timing of the leading ignition plug 17 is always normal.

When the engine speed increases, switch 23 opens or when the engine load increases to lower the intake vacuum, the vacuum diaphragm switch 24 opens, with the result that the relay coil 32 of the switching relay 29 is deenergized and contacts 30 and 33 are open and contacts 30 and 31 closed. Since the ignition timing of the trailing ignition plug 16 delays only when the switching relay 29 is operating, the ignition timing of ignition plug 16 is delayed only when the engine is operating at low speed and low loads.

It is understood that even if the leading ignition plug 17 is delayed in its ignition timing instead of the trailing ignition plug 16, the same effect may be provided as previously described, although it is preferable that the trailing ignition plug 16 is delayed in its ignition. Thus, it is clear from the foregoing description that by providing a spark in which the ignition timing of either ignition plug is largely delayed, the combustion of the mixture gas continues into the exhaust manifold of the engine so that the temperature of the exhaust gas is raised only in burning of any otherwise unburned components contained within the exhaust gas. Further, the ignition plugs always ignite and accordingly, the ignition plugs are neither fouled by the burning products nor are they wet by the fuel.

It is clear that the operating points and connecting method such as whether they are in parallel or in series with each other, insofar as switch 23 and the vacuum diaphragm switch 24 is concerned, may be freely determined depending upon the various conditions or the position of the components with respect to the system. It is also clear that switch 23 responsive to r.p.m. of the engine direct or the vacuum operated switch 24 may be replaced by other means such as a switch detecting the opening of the throttle valve for instance. Thus, the ignition system in accordance with the present invention may provide a delay in the ignition timing of either of the ignition plugs so as to lower the density of the detrimental components contained within the exhaust gas without lowering the general performance of the engine.

What is claimed is:

1. In an ignition system for a rotary piston internal combustion engine including two ignition plugs carried by said engine and exposed to a common combustion chamber from the internal housing surface thereof, and ignition circuits for respective plugs, the improvement wherein: one of said ignition circuits includes primary contact points opening at normal timing position and secondary contact points opening at delayed timing position and said system further comprising means for switching ignition from said primary to said secondary contact points when said engine operates at low speed and/or low load.

2. An ignition system as claimed in claim 1 further comprising a switching relay coil, a vacuum diaphragm switch and a switch responsive to engine speed, and said means for switching from said primary to secondary contact points is responsive to operation of said switching relay coil, and said vacuum diaphragm switch and said engine speed responsive switch are series connected with said relay coil.

3. An ignition system for a rotary piston internal combustion engine comprising:

two ignition plugs carried by said engine and exposed to a common combustion chamber from the internal surface thereof, respective ignition circuit means connected to said plugs, one of said ignition plugs being disposed in leading relationship with respect to the direction of rotation of the engine and the other in trailing relationship therewith, a pair of ignition coils and distributors for providing an electrical spark across respective ignition plugs, an interrupting device and a distributing device provided on the distributor for the tailing ignition plug, said interrupting device including primary contact points for operation under normal conditions, and secondary contact points for delayed opening and at a predetermined angle from the normal contact points, a first normally closed switch adapted to open when engine r.p.m. exceeds a predetermined value, a normally closed vacuum diaphragm switch adapted to open when the intake vacuum increases to a predetermined value, a switching relay having a normally closed contact and a relay coil and normally open contacts operating to close when the relay coil is energized, said switching relay being operatively coupled to said interrupting device, such that, when said relay coil is energized, said first contacts are connected to the normal primary contact points and said second contacts are connected to the secondary contact points, and means for energizing said relay coil when said vacuum diaphragm switch and said engine r.p.m. switches are closed.